US012583346B2

(12) United States Patent
Kaufmann et al.

(10) Patent No.: US 12,583,346 B2
(45) Date of Patent: Mar. 24, 2026

(54) ELECTRIC VEHICLE CHARGING SYSTEM

(71) Applicant: ABB E-Mobility B.V., Delft (CH)

(72) Inventors: Lilian Kaufmann, Birmenstorf (CH); Wiebe Zoon, Delft (NL); Francisco Garcia-Ferre, Baden (CH); Pedram Kheiri, Hausen (CH); Stefan Raaijmakers, Delft (NL); Ali Ugur, The Hague (NL)

(73) Assignee: ABB Schweiz AG, Baden (CH)

( * ) Notice: Subject to any disclaimer, the term of this patent is extended or adjusted under 35 U.S.C. 154(b) by 702 days.

(21) Appl. No.: 17/887,100

(22) Filed: Aug. 12, 2022

(65) Prior Publication Data

US 2023/0047203 A1 Feb. 16, 2023

(30) Foreign Application Priority Data

Aug. 13, 2021 (EP) ..................................... 21191166

(51) Int. Cl.
*B60L 53/302* (2019.01)
*B60L 53/16* (2019.01)
*B60L 53/18* (2019.01)

(52) U.S. Cl.
CPC ............. *B60L 53/302* (2019.02); *B60L 53/16* (2019.02); *B60L 53/18* (2019.02)

(58) Field of Classification Search
CPC ......... B60L 53/302; B60L 53/16; B60L 53/18
USPC ........................................................ 320/109
See application file for complete search history.

(56) References Cited

U.S. PATENT DOCUMENTS

| | | | |
|---|---|---|---|
| 5,591,937 A | 1/1997 | Woody et al. | |
| 5,909,099 A | 6/1999 | Watanabe et al. | |
| 9,786,961 B2 * | 10/2017 | Dyer ..................... | B60L 53/302 |
| 10,029,575 B2 | 7/2018 | Remisch | |
| 10,081,262 B2 | 9/2018 | Nagel et al. | |
| 10,109,395 B2 | 10/2018 | Beimdieck et al. | |
| 11,628,746 B1 * | 4/2023 | Pill ................... | H02J 7/007194 |
| | | | 320/109 |
| 11,654,787 B1 * | 5/2023 | Palombini ............... | B60L 53/53 |
| | | | 320/109 |
| 2013/0029193 A1 * | 1/2013 | Dyer ................... | H01M 10/486 |
| | | | 180/65.21 |

(Continued)

FOREIGN PATENT DOCUMENTS

| | | |
|---|---|---|
| DE | 102011100389 A1 | 5/2012 |
| DE | 102016206300 A1 | 10/2017 |

(Continued)

OTHER PUBLICATIONS

European Patent Office, Extended European Search Report in European Patent Application No. 21191166.4, 6 pp. (Feb. 7, 2022).

*Primary Examiner* — Suresh Memula
(74) *Attorney, Agent, or Firm* — McCarter & English, LLP; Michael M. Gnibus

(57) ABSTRACT

An electric vehicle charging system includes a charging connector configured to receive a charging cable. The charging cable and/or the charging connector provide structures for guiding a coolant, cooling the charging cable and/or the charging connector. The electric vehicle charging system further comprises a thermal management unit for cooling the coolant. The thermal management unit comprises a vapor-compression refrigeration system for cooling the coolant below ambient temperature.

7 Claims, 2 Drawing Sheets

(56)　　　　References Cited

U.S. PATENT DOCUMENTS

| | | | | |
|---|---|---|---|---|
| 2014/0266038 A1* | 9/2014 | Gibeau | .................. | B60L 50/16 |
| | | | | 320/109 |
| 2016/0093904 A1* | 3/2016 | Albertus | .............. | H01M 12/08 |
| | | | | 429/405 |
| 2017/0219261 A1* | 8/2017 | Mahrouche | ............ | F25B 45/00 |
| 2018/0264957 A1 | 9/2018 | Fuehrer et al. | | |
| 2019/0074628 A1 | 3/2019 | Fuehrer | | |
| 2019/0315239 A1 | 10/2019 | Beimdieck et al. | | |
| 2021/0013559 A1* | 1/2021 | Lee | ................... | H01M 10/6568 |
| 2023/0134808 A1* | 5/2023 | Wiegman | .............. | B60L 3/0023 |
| | | | | 320/109 |
| 2023/0135249 A1* | 5/2023 | Wiegman | ................ | B64F 1/362 |
| | | | | 320/109 |
| 2023/0135633 A1* | 5/2023 | Wiegman | ................ | B60L 53/35 |
| | | | | 320/109 |
| 2023/0138387 A1* | 5/2023 | Wiegman | ................ | B60L 53/62 |
| | | | | 320/109 |
| 2023/0158906 A1* | 5/2023 | He | ..................... | B60H 1/00428 |
| | | | | 320/109 |
| 2023/0312138 A1* | 10/2023 | Wiegman | ................ | B60L 53/68 |
| | | | | 320/109 |

FOREIGN PATENT DOCUMENTS

| | | | | | |
|---|---|---|---|---|---|
| DE | 102016117011 A1 | | 3/2018 | | |
| EP | 2938937 A1 | * | 11/2015 | ............... | F17D 1/08 |
| EP | 3512046 A1 | * | 7/2019 | ............. | B60L 53/16 |
| JP | 2012-238532 A | | 12/2012 | | |
| WO | WO 2017/133893 A1 | | 8/2017 | | |
| WO | WO 2017/143295 A1 | | 8/2017 | | |
| WO | WO 2017/162464 A1 | | 9/2017 | | |
| WO | WO 2017/162494 A1 | | 9/2017 | | |
| WO | WO 2017/162532 A1 | | 9/2017 | | |
| WO | WO 2017/162651 A1 | | 9/2017 | | |
| WO | WO 2018/006903 A1 | | 1/2018 | | |
| WO | WO 2018/050724 A1 | | 3/2018 | | |
| WO | WO 2018/060151 A1 | | 4/2018 | | |
| WO | WO 2018/192805 A1 | | 10/2018 | | |
| WO | WO 2019/008047 A1 | | 1/2019 | | |

* cited by examiner

ELECTRIC VEHICLE CHARGING SYSTEM

CROSS-REFERENCE TO RELATED APPLICATIONS

This patent application claims priority to European Patent Application No. 21191166.4, filed on Aug. 13, 2021, which is incorporated herein in its entirety by reference.

FIELD OF THE DISCLOSURE

The present disclosure relates to an electric vehicle charging system for an electric vehicle.

BACKGROUND OF THE INVENTION

One limiting factor in charging cables for electric vehicles is the heat that is generated when high currents flow through the cable and the electrical connector from the charging station to the battery of a vehicle. The heat may be actively conducted away from the heat sources using liquids. In this way current rates over 500 A are achieved. For this kind of charging system, cooling arrangements are required that comprise and conduct the liquid from heat sinks to the heat sources and back. Additional devices such as pumps are necessary.

Prior art US 2019/0315239 A1 discloses an electrical contact element for a car charging plug connector. The electrical contact element has a contact part and a connection part, wherein the connection part can be connected to an electrical conductor of a cable. Cooling liquid can be delivered to the contact element. As a result, the heat produced on the contact element is extracted directly.

U.S. Pat. No. 10,109,395 B2 relates to a connection unit for a fluid-cooled cable and to a system composed of a plug-in connector, a fluid-cooled cable and a connection unit. The connection unit comprising a housing, which has a cable connecting opening, a fluid inlet opening and a fluid outlet opening.

US 2019/0074628 A1 relates to a plug-in connector part for plug-in connection to a mating plug-in connector part.

Prior art DE 10 2011 100 389 A1 discloses a charging cable for transferring electrical energy to an energy storage device of an electric or hybrid vehicle. The charging cable comprises a coolant-guiding device, which is arranged inside a cable jacket.

BRIEF SUMMARY OF THE INVENTION

In one general aspect, the present disclosure describes an electric vehicle charging system, with which high current rates are possible.

According to the disclosure, an electric vehicle charging system comprising a charging connector configured to receive a charging cable. The charging cable and/or the charging connector provide means for guiding a coolant, cooling the charging cable and/or the charging connector. The electric vehicle charging system further comprises a thermal management unit for cooling the coolant. The thermal management unit comprises a vapor-compression refrigeration system (VCRS) for cooling the coolant below ambient temperature.

The charging connector provides the charging current from a charging station to the battery of an electric vehicle. Thus, "charging connector" is understood to be a handheld device such as a charging gun or charging nozzle. The counterpart of the charging connector on vehicle-side is called socket. For charging the vehicle, the charging connector provides a charging cable. In the charging cable at least charging wires for conducting the electrical current to the vehicle are arranged. A means for guiding a coolant thereby preferably is a cooling cable or cooling line in which the coolant is flowing. However, also other means for guiding the coolant are possible. The coolant could be any fluid with which a cooling effect to the cable in particular the charging wires in the cable and/or the connector, respectively the electric contacts of the connector, is achieved.

BRIEF DESCRIPTION OF THE SEVERAL VIEWS OF THE DRAWING(S)

DETAILED DESCRIPTION OF THE INVENTION

Figure 1:
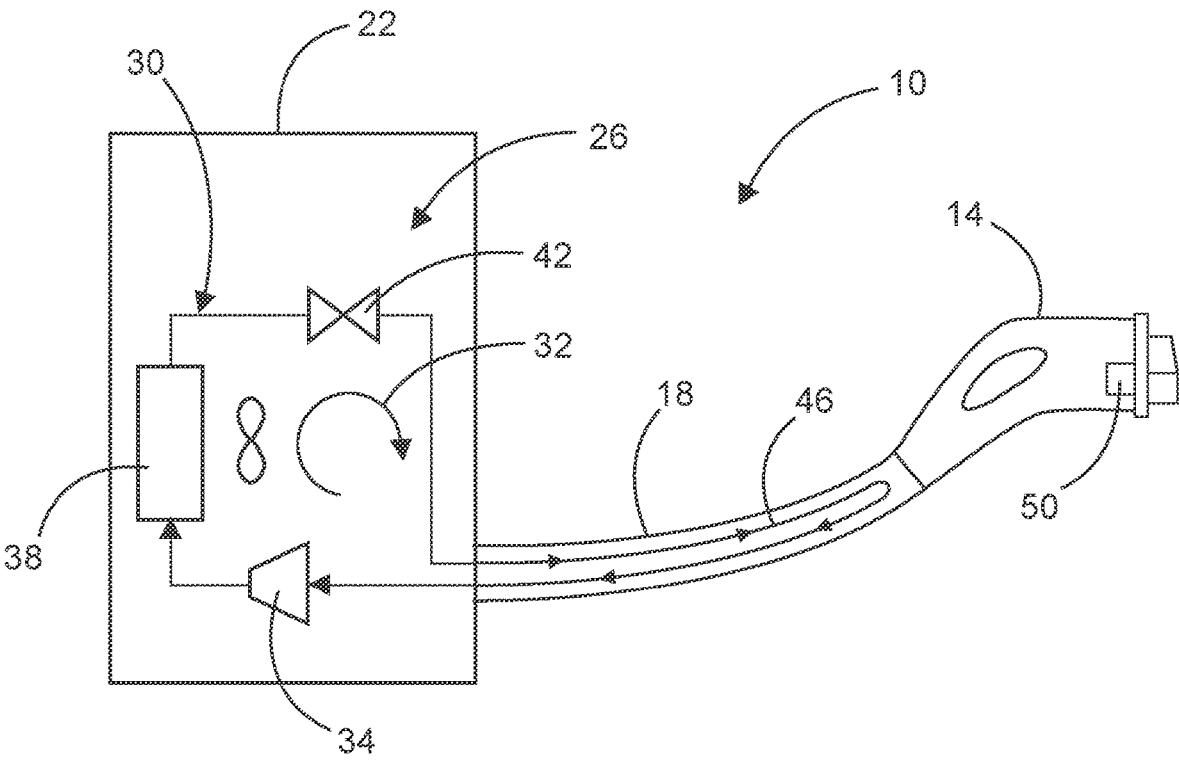
FIG. 1 is a schematic of an electric vehicle charging system according to a first embodiment of the present disclosure.

FIG. 1 shows an electric vehicle charging system 10 according to a first embodiment of the present invention. Such an electric charging system 10 comprises a charging connector 14, which has to be connected to a socket (not shown) of an electric vehicle for charging the battery. The charging connector 14 is connected with a charging cable 18, extending from a charging station 22. In the charging station 22, a thermal management unit 26 is provided. According to the invention, the thermal management unit 26 comprises a vapor-compression refrigeration system 30 providing a refrigeration cycle 32. The vapor-compression refrigeration system 30 comprises a compressor 34 for compressing a refrigerant. An air-cooled heat exchanger 38 is arranged downstream to the compressor 34 for cooling the compressed refrigerant.

An expansion valve 42 is arranged next to the air-cooled heat exchanger 38. With the expansion valve 42, the refrigerant is expanded, so that the temperature of the refrigerant is decrease below ambient temperature. The thermal management unit 26 in the charging station 22 is connected to coolant lines 46 provided in the charging cable 18, so that the refrigerant is transported through the coolant lines 46. In the shown embodiment, the coolant lines 46 merely cool the charging cable 18 of the vehicle charging system 10. The coolant lines 46 therefore do not extend into the charging connector 14 for cooling electrical contacts 50 of the charging connector 14.

Figure 2:
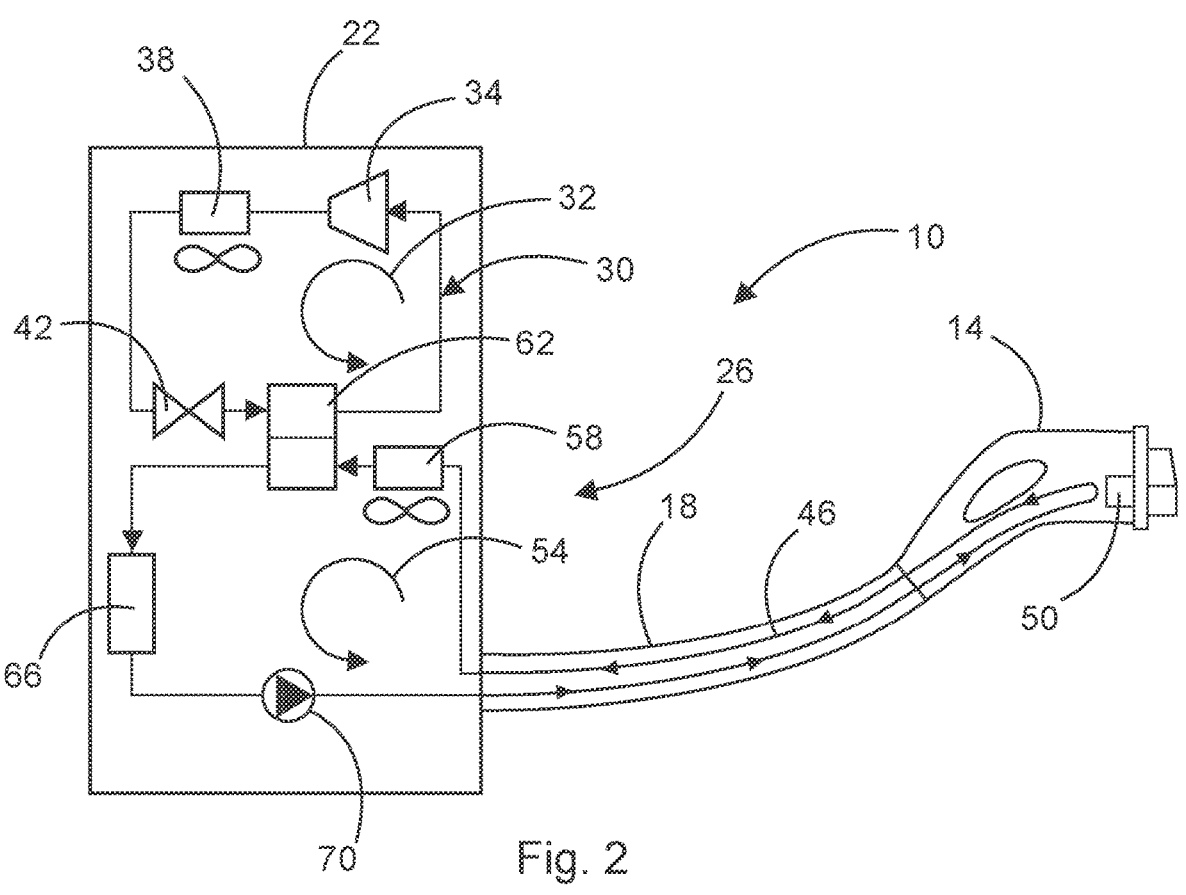
FIG. 2 is a schematic of an electric vehicle charging system according to a second embodiment of the present disclosure.

In FIG. 2, an electric vehicle charging system 10 according to a second embodiment of the present invention is shown. The second embodiment differs to the first embodiment shown in FIG. 1 by the features that additionally to a refrigeration cycle 32 of the vapor-compression refrigeration system 30, a cooling cycle 54 of the coolant is arranged in the charging station 22. The coolant cycle 54 in this embodiment comprises an air-precooling heat exchanger 58 for precooling the coolant medium. An interconnecting heat exchanger 62 is arranged downstream to the air-precooling heat exchanger 58. The interconnecting heat exchanger 62 is arranged between the cooling cycle 54 of the coolant and the refrigeration cycle 32. By means of the interconnecting heat exchanger 62, heat of the coolant is transferred to the refrigerant of the refrigeration cycle 32, so that the coolant is cooled.

After the interconnecting heat exchanger 62, the coolant is transported to a coolant tank 66, where the coolant is stored. A coolant pump 70 is arranged downstream to the coolant tank 66. From the coolant pump 70, the coolant is pumped to the coolant lines 46. In this embodiment, the coolant lines 46 are provide in the charging cable 18 and the charging connector 14 for cooling the charging cable 18 and the electrical contacts 50 in the charging connector 14.

Additionally to the interconnecting heat exchanger 62, the refrigeration cycle 32 comprises downstream to the interconnecting heat exchanger 62 the compressor 34 for compressing the refrigerant. The air-cooled heat exchanger 38, is arranged after the compressor 34 for cooling the refrigerant. Upstream to the interconnecting heat exchanger 62 the expansion valve 42 is provided for expanding the refrigerant in the refrigeration cycle 32.

In a further embodiment, not shown in the figures, the air-precooling heat exchanger 58 provided in the cooling cycle 54 for precooling the coolant is omitted.

Figure 3:
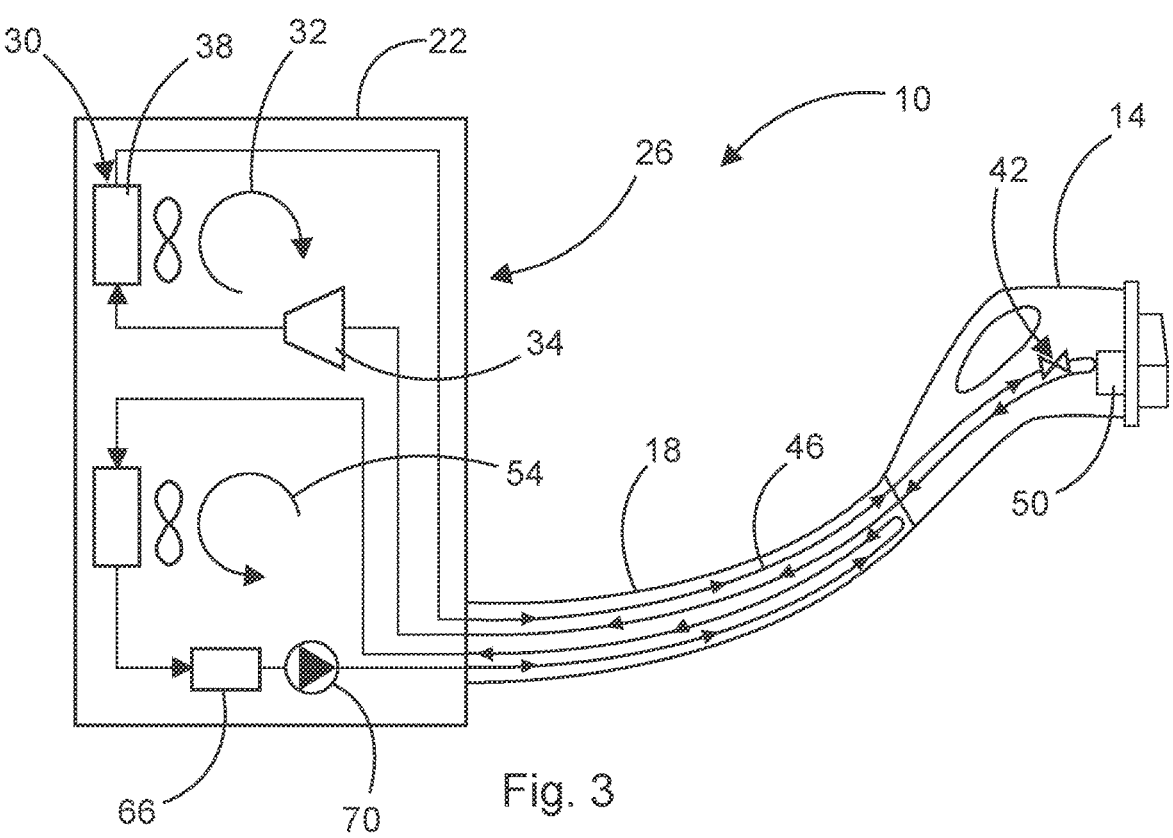
FIG. 3 is a schematic of an electric vehicle charging system according to a third embodiment of the present disclosure.

FIG. 3 shows an electric vehicle charging system 10 according to a third embodiment of the present invention. This embodiment differs to the first embodiment in that in the charging station 22, a cooling cycle 54 is provided additionally to the refrigeration cycle 32. The refrigeration cycle 32 thereby cools the electrical contacts 50 of the charging connector 14, while the cooling cycle 54 cools the charging cable 18. Both cycles therefore can be operated independently to each other. The third embodiment further differs to the first embodiment in that the expansion valve 42 of the refrigeration cycle 32 is provided in the charging connector 14. The refrigerant therefore is firstly expanded in the charging connector 14. Thereby, a high cooling effect of the electrical contacts 50 is achieved.

The term thermal management unit has to be understood comprising all parts, which are used for cooling the coolant. According to the invention the thermal management unit at least comprises a vapor-compression refrigeration system. Such a system uses a refrigerant, wherein the refrigerant undergoes a phase change so that a temperature below ambient temperature is achieved. In contrast to a coolant, which is cooled to a temperature close to the ambient temperature the use of a vapor-compression refrigeration system results to a higher cooling effect of the connector and/or the cable. Accordingly, the vehicle can be charged with a higher electric current, without exceeding a temperature limit of the vehicle charging system.

As the heat loss in the cable increases with a reduced cross section of the wires and an increased length of the cable, with this invention it is possible reducing the cross section of the cable and/or using a longer cable. Further, by using a vapor-compression refrigeration system the vehicle charging system also can be used in regions with high ambient temperature like e.g. in the desert. Especially in these areas, a common air-cooled heat exchanger has a low cooling effect on the coolant. Usability of the vehicle charging system therefore is improved.

In one embodiment, the coolant is a refrigerant of the vapor-compression refrigeration system with which the charging cable and/or the charging connector is cooled. The refrigerant therefore is directly used for cooling the components of the vehicle charging system. Accordingly, no further circuit is used for cooling the components. Thus, the number of components are reduced. A respective vehicle charging system can be economically provided. As the refrigerant is directly evaporated in the cooling cable, the heat transfer is improved.

In a further embodiment, the vapor-compression refrigeration system comprises an expansion valve for expanding the refrigerant, arranged in the charging connector. In other words, the refrigerant is provided as compressed fluid to the charging connector. By using this configuration the refrigerant is directly expanded in the charging connector, so that the charging connector respectively the electrical contacts can be cooled with a maximum cooling efficiency.

Alternatively, the vapor-compression refrigeration system comprises an expansion valve for expanding the refrigerant, arranged in a charging station of the electric vehicle charging system. The charging station thereby is a stationary part of the vehicle charging system. In this charging station, usually most of the components are accommodated. Preferably, also the vapor-compression refrigeration system is arranged in the charging station. With this arrangement, the charging connector could be provided smaller compared to the configuration where the expansion valve is arranged in the charging connector. Maintenance of the expansion valve is improved.

Advantageously, a refrigeration cycle of the vapor-compression refrigeration system is provided separate to a cooling cycle of the coolant, wherein an interconnecting heat exchanger is arranged between both cycles for removing heat of the coolant. In this configuration two independent cycles are provided, which are merely thermally connected to each other via the interconnecting heat exchanger. Preferably, the interconnecting heat exchanger is a counterflow heat exchanger. As both cycles are independent from each other the coolant and the refrigerant can be freely chosen without boundary conditions of the other cycle. Accordingly, the coolant and the refrigerant can be selected to have a maximum efficiency.

In a further advantageous development, the thermal management system comprises the vapor-compression refrigeration system for cooling the coolant provided to the charging connector, and an air-cooled heat exchanger for cooling the coolant provided to the charging cable. The thermal management system therefore comprises two totally independent cooling systems. One of these cooling systems cools the electric contacts wherein the other cooling systems cools the electric wires in the cable. Each of the cooling systems has a separate cooling line, so that two cooling loops are provided.

Using two separate cooling systems has the advantage, that each system can be optimized to the component to be cooled, so that the electric contacts gets the coolant having a much lower temperature as the cable.

As the electrical contacts are already cooled by the other cooling system, it is not necessary to have a separate cooling line directly to the electrical contacts for providing the contacts with the coolest coolant. Therefore, the cooling loop of the cable preferably is arranged that the coolant supply is through one of the poles, while a coolant return is through the other pole. The cooling loop thereby is simplified.

Preferably, the thermal management unit comprises an air-precooling heat exchanger for precooling of the coolant arranged upstream to the interconnecting heat exchanger and between the refrigeration cycle and the cooling cycle of the coolant. The air-precooling heat exchanger thereby exchanges the heat of the coolant to the ambient air. With the air-precooling heat exchanger, the coolant is cooled before it enters the interconnecting heat exchanger. As the temperature of the coolant entering the interconnecting heat exchanger is already lowered, the compressor stage of the refrigeration cycle can be dimensioned much smaller.

As cooling of the coolant is provided with the air-precooling heat exchanger it is not necessary running the refrigeration cycle the whole time. The refrigeration cycle therefore can be switched on when required. The energy consumption of the vehicle charging system can be reduced. In addition, if the refrigeration cycle has a failure, the charging system still can be operated at least on a reduced current rate. Such an arrangement therefore is fail safe.

In one embodiment, the same air-cooled heat exchanger is used for precooling the coolant and for cooling the compressed refrigerant of the refrigeration cycle. In other words, merely one heat exchanger is necessary for cooling the coolant and the refrigerant. The components therefore can be reduced, so that such a vehicle charging system is more economically.

LIST OF REFERENCE NUMBERS 10 vehicle charging system
14 charging connector
18 charging cable
22 charging station
26 thermal management unit
30 vapor-compression refrigeration system
32 refrigeration cycle
34 compressor
38 air-cooled heat exchanger
42 expansion valve
46 coolant line
50 electrical contacts
54 cooling cycle
58 air-precooling heat exchanger
62 interconnecting heat exchanger
66 coolant tank
70 coolant pump All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electric vehicle charging system, comprising:
   a charging connector configured to receive a charging cable;
   wherein the charging cable and/or the charging connector provide structures configured for guiding a coolant, cooling the charging cable and/or the charging connector; and
   a thermal management unit configured for cooling the coolant;
   wherein the thermal management unit comprises a vapor-compression refrigeration system for cooling the coolant below an ambient temperature,
   wherein the vapor-compression refrigeration system comprises an expansion valve for expanding the refrigerant, the expansion valve being arranged in the charging connector.

2. The electric vehicle charging system according to claim 1, wherein the coolant is a refrigerant of the vapor-compression refrigeration system with which the charging cable and/or the charging connector is cooled.

3. The electric vehicle charging system according to claim 2, wherein the vapor-compression refrigeration system comprises an expansion valve for expanding the refrigerant, the expansion valve being arranged in a charging station of the electric vehicle charging system.

4. The electric vehicle charging system according to claim 1, wherein a refrigeration cycle of the vapor-compression refrigeration system is provided separate to a cooling cycle of the coolant, and wherein an interconnecting heat exchanger is arranged between both cycles for removing heat of the coolant.

5. The electric vehicle charging system according to claim 4, wherein the thermal management unit comprises an air-precooling heat exchanger for precooling the coolant arranged upstream to the interconnecting heat exchanger and between the refrigeration cycle and the cooling cycle of the coolant.

6. The electric vehicle charging system according to claim 5, wherein the air-cooled heat exchanger is used for precooling the coolant and for cooling the compressed refrigerant of the refrigeration cycle.

7. The electric vehicle charging system according to claim 1, wherein the thermal management unit comprises the vapor-compression refrigeration system for cooling the coolant provided to the charging connector, and wherein the thermal management unit further comprises an air-cooled heat exchanger for cooling the coolant provided to the charging cable.

* * * * *